United States Patent [19]
De Souza et al.

[11] Patent Number: 6,003,528
[45] Date of Patent: Dec. 21, 1999

[54] METHOD FOR THE THERMO-CHEMICAL DEWAXING OF LARGE DIMENSION LINES

[75] Inventors: Celso Rodrigo De Souza; Carlos Nagib Khalil, both of Rio de Janeiro, Brazil

[73] Assignee: Petroleo Brasileiro S.A. - Petrobras, Rio de Janeiro, Brazil

[21] Appl. No.: 08/994,431

[22] Filed: Dec. 19, 1997

[30] Foreign Application Priority Data

Mar. 19, 1997 [BR] Brazil ..................................... 9701336

[51] Int. Cl.$^6$ ..................................................... B08B 9/00
[52] U.S. Cl. ................................................... 134/22.1
[58] Field of Search .......................... 134/22.1; 260/27; 50/509

[56] References Cited

U.S. PATENT DOCUMENTS

| | | |
|---|---|---|
| 3,669,189 | 6/1972 | Fischer . |
| 4,755,230 | 7/1988 | Ashton et al. . |
| 5,183,581 | 2/1993 | Khalil et al. . |
| 5,639,313 | 6/1997 | Khalil ........................................... 134/18 |

FOREIGN PATENT DOCUMENTS

| | | |
|---|---|---|
| 2276218 | 9/1994 | United Kingdom . |

*Primary Examiner*—Jill Warden
*Assistant Examiner*—Yolanda E. Wilkins
*Attorney, Agent, or Firm*—Sughrue, Mion, Zinn, Macpeak & Seas, PLLC

[57] ABSTRACT

An improved method is provided for the thermo-chemical dewaxing a large dimension line or conduit using a Nitrogen Generation System/Emulsion. The method involves introducing an emulsion into the conduit to be waxed. The emulsion comprises an internal aqueous phase and an external organic phase. The aqueous phase comprises an oxidizing nitrogen salt, a reducing nitrogen salt and water. The organic phase comprises a non-polar organic liquid, such as kerosene, and a delayed action activator for inducing the reaction of said oxidizing nitrogen salt and said reducing nitrogen salt. The improvement comprises a delayed action activator which may be a copolyanhydride such as poly (adipic-co-sebacic)anhydride solubilized in a polar organic solvent such as chloroform. The solubilized delayed action activator is easily and accurately pumped into the conduit to be dewaxed. The emulsion is maintained in the conduit until the delayed action activator induces the reaction of the nitrogen salts to generate nitrogen and heat, thereby fluidizing wax in the conduit.

11 Claims, 6 Drawing Sheets

METHOD FOR THE THERMO-CHEMICAL DEWAXING OF LARGE DIMENSION LINES

FIELD OF THE INVENTION

The present invention relates to an improved, thermo-chemical method for the dewaxing of hydrocarbon transmission conduits or lines, especially those having extensive length and large internal diameter, for example, those hydrocarbon transmission conduits which are longer than 10 and up to 50,000 meters and whose internal diameter is larger than 4 and up to 12 inches or more. The method is especially useful when applied from a production platform or any equivalent equipment. The method uses a treating fluid made from a water/oil emulsion which contains in its internal, aqueous phase, nitrogen- and heat-generating nitrogen salts and in the external, organic phase, a delayed action activator, such as a copolyanhydride which is solubilized in a polar organic solvent. The copolyanhydride is one of controlled hydrodegradability this leading to a marked delay of the onset of the nitrogen- and heat-generation reaction. The solubilization of the copolyanhydride in a polar organic solvent makes the use of the activator much more accurate and simple, in view of the greater easiness in pumping a solution of the activator as compared to the state-of-the-art where the activator was pumped as a suspension in an aliphatic hydrocarbon solvent.

Broadly considered, the present invention relates to an improved method and composition for fluidization and removal of paraffin deposits from a large dimension-hydrocarbon transmission conduit or line by combining thermal, chemical and mechanical effects provided for simultaneously by the emulsified dewaxing fluid, the improvement consisting in providing a delayed-action activator which is a copolyanhydride solubilized in a polar organic solvent, the pumping of the activator being thus made in a more accurate and easy way as compared to the pumping of the suspension of activator in an aliphatic hydrocarbon solvent of the state-of-the-art.

BACKGROUND

U.S. Pat. No. 5,183,581, of the Applicant and herein fully incorporated by reference, teaches the use of a Nitrogen Generating System/Emulsion useful for the dewaxing of producing formations, whereby an increase in temperature provided by the reaction of nitrogen salts combined in the presence of an organic solvent in the external phase of the emulsion to cause paraffin removal from the reservoir. The salts used are an oxidizing nitrogen salt and a reducing nitrogen salt.

According to U.S. Pat. No. 5,639,313, also of the Appliant and herein fully incorporated by reference and directed to the dewaxing of hydrocarbon conduits, aqueous solutions which contain selected nitrogen reactants are individually prepared in mixing tanks and then added, still individually, to adequate volumes of a hydrocarbon organic solvent designed to efffect the dissolution of the specific kind of paraffin deposit found in the conduit or line. Also, dispersing agents and/or pour point depressants may be advantageously added to the thus prepared emulsions. The activation of the chemical reaction between the nitrogen reagents is effected with the aid of a solution of a weak organic acid such as acetic add. The emulsion contains in its internal phase the nitrogen salt which is stable in the slightly acidic medium having a pH between 3 and 6. The external phase is made up of an organic solvent or mixtures of organic solvents, especially hydrocarbon solvents. The breaking of the emulsion triggers the reaction of heat and nitrogen generation, which is called Nitrogen Generating System or SGN after the original Portuguese.

On the basis of the results of initial effective internal volume assessment of the conduit to be dewaxed, adequate volumes of the two emulsions are prepared which are simultaneously injected to the interior of the conduit, co-currently to the production flow by means of surface pumping systems. Support vessels comprise the terminals for injecting treating fluid at the inlet and for recovering the mixture of spent fluid and fluidized paraffin at the outlet.

The activation of the treating fluid is effected by means of acetic acid. The thus prepared fluid is then pumped at maximum possible flowrate from the vessel installed upstream of the conduit being treated. The mixture of emulsions C (ammonium chloride) and N (sodium nitrite) produces, exclusively on flow, the Nitrogen Generating System, emulsified SGN The emulsions are pumped at equal and constant flowrates while being displaced with the aid of a small bed of kerosene and seawater so as to place the fluid in the second half of the conduit. After the period of time that the fluid is left at rest so that it can effect the dissolution and removal of the paraffin deposit, the simultaneous pumping of emulsions C and N is resumed in order to treat the first half of the conduit. After another rest period the SGN treating fluid is withdrawn and the final internal effective volume is assessed in order to evaluate the efficacy of the treatment. Thus, the treating fluid using the Nitrogen Generating System works from downstream to upstream in the conduit to be dewaxed, the removal of the paraffin deposits being practically complete. However, as already stated before, the activation with acetic acid limits the use of this system to conduits of up to 4000 meters length and 4 inches internal diameter since the release of hydrogen ion is relatively quick and the emulsion is rapidly broken, and the nitrogen and heat generation reaction is initiated.

In spite of the excellent results in terms of paraffin removal obtained in the field by the technique set forth in U.S. Pat. No. 5,639,313, there are some drawbacks in the process which stem on the one hand from the relatively short time to the onset of the heat and nitrogen generating reaction which limits the length and diameter of the line to be dewaxed, and on the other hand, the high cost which derives from the use of support vessels where treating fluids are prepared and from where same are pumped to the line, this item representing nearly 70% of the overall cost of the process.

Thus, there was a need to develop a method able to effect the thermo-chemical dewaxing of highly-extended, high-volume hydrocarbon transmission conduits, and wherein the pumping of the treating fluid made up of one single aqueous solution of nitrogen salts could be effected from the production platform or from any equivalent equipment, this representing great savings. The pumping of one single solution which contained both the nitrogen salts, ammonium chloride and sodium nitrite, represents on its own a significant progress since this pumping should be done at constant flowrate, the feature of being constant being a difficult achievement when two solutions must be separately pumped. Also, because of the highly-extended feature of the conduit, the onset of the reaction of heat and nitrogen generation should be strongly delayed. Therefore, as described and claimed in U.S. application Ser. No. 08/742, 126, the contents of which are fully incorporated in the present application, the Applicant has developed a polyanhydride-based polymer matrix designed to have an extended delayed action in the activation of the chemical reaction of the Nitrogen Generation System as applied to the dewaxing of large dimension lines.

However, as the polyanhydride of U.S. Ser. No. 08/742,126 was used in suspension in an aliphatic solvent, and in view of the large volumes of several cubic meters required to activate the SGN reaction as applied in the field, the pumping of the polyanhydride was rendered difficult and inaccurate, due to inhomogeneities or sedimentation of the suspended product which eventually led to variable hydrolysis rates of the polyanhydride. The applicant has thus developed new linear, aliphatic copolyanhydrides which are used in solution in a polar organic solvent, this leading to more uniform, accurate and easier pumping of the activator besides a better control of the hydrolysis rate of the delayed-action activator. The use of such copolyanhydrides as delayed-action activators constitute the improvement in the method for the thermo-chemical dewaxing of large dimension conduits described and claimed in the present invention.

SUMMARY OF THE INVENTION

There is provided an improved method for the thermo-chemical dewaxing of a hydrocarbon transmission conduit containing paraffin deposit, said method comprising the steps of:

(a) introducing into said conduit an emulsion comprising an internal aqueous phase and an external organic phase, said aqueous phase comprising an oxidizing nitrogen salt, a reducing nitrogen salt and water, and said organic phase comprising a non-polar organic liquid, said emulsion comprising a delayed action activator for inducing the reaction of said oxidizing nitrogen salt and said reducing nitrogen salt, wherein the improvement comprises a delayed action activator which is a linear, aliphatic copolyanhydride solubilized in a polar organic solvent;

(b) maintaining said emulsion in said conduit under conditions sufficient to fluidize paraffin deposit and to generate nitrogen gas and heat from the reaction of said oxidizing nitrogen salt and said reducing nitrogen salt; and (c) removing the fluidized paraffin deposit from said conduit.

As in U.S. Ser. No. 08/1742,126, the present method is especially useful for thermo-chemical dewaxing of large dimension conduits of which one end is connected to a production platform. Prior to the dewaxing treatment, oil may be withdrawn from the conduit or line to be dewaxed. The treating fluid may be prepared in the production platform or any equivalent equipment and pumped into the line. The treating fluid contains the Nitrogen Generating System SGN. The delayed action activator of the heat and nitrogen generation reaction is a linear, aliphatic copolyanhydride, such as the copolymer of adipic acid and a $C_8$–$C_{14}$ carboxylic diacid. The treating fluid is introduced in the conduit. After the period of time necessary for the treating fluid to effect the treatment, the spent fluids and the emulsified paraffin may be recovered and well production resumed.

The linear, aliphatic copolyanhydride used as delayed-action activator in the present invention generally comprises of between 95 and 15 mole % of a carboxylic diacid such as adipic acid and of from 5 and 85 mole % of a carboxylic diacid comonomer in $C_8$–$C_{14}$ such as sebacic acid. A preferred amount is between 25 and 75 mole % of the comonomer.

The delayed-action activator of the present invention is to be dissolved in a polar organic solvent such as chloroform in an amount of from 8 to 40 parts by weight of activator to 100 parts by volume of polar organic solvent. The preferred amount is of from 10 to 30 wt/vol of activator/solvent.

A limiting feature of the copolyanhydrides of the present invention is that upon hydrolysis the pH of the medium, that is, the nitrogen salts aqueous solution which will generate heat and nitrogen, must be kept at 5.0 or less. Copolymers which upon hydrolysis yield pH higher than 5.0 in the medium do not belong to the scope of the present invention since under conditions of pH higher than 5.0 the SGN reaction is not initiated.

Therefore, the present method provides an improvement in the thermo-chemical dewaxing of long, high-volume hydrocarbon transmission conduits by means of a heat and nitrogen generation reaction (SGN) which is activated by means of a copolyanhydride solubilized in a polar organic solvent, the copolyanhydride having an improved degree of controlled hydrodegradability which conveys in a very accurate way the suitable delay to the onset of the heat and nitrogen generation reaction.

The present method also provides new copolyanhydrides prepared from adipic acid and a comonomer which is a carboxylic diacid in $C_8$–$C_{14}$ such as sebacic acid having of between 5 and 85 mole % of the comonomer in $C_8$–$C_{14}$, which upon solubilization in a polar organic solvent yield an activator for the SGN reaction which when pumped shows improved features as regards accuracy in pumping volumes, homogeneity of the pumped stock and fully controlled hydrolysis rate.

The present invention also provides delayed-action activators based on linear, aliphatic copolyanhydrides solubilized in a polar organic solvent whose hydrodegradability may be controlled by means of the kind and content of comonomer used as well as by means of the molecular weight of the copolyanhydride.

Also, the present invention provides delayed-action activators based on linear, aliphatic copolyanhydrides solubilized in a polar organic solvent which upon hydrolysis in the presence of heat- and nitrogen-generating nitrogen salt solutions cause that such solutions reach pH values of 50 or less (for temperatures between 10 and 25° C.), these values being required for the onset of the heat- and nitrogen-generation reaction at rates as required by the conditions of industrial operations.

DETAILED DESCRIPTION

Figure 1:
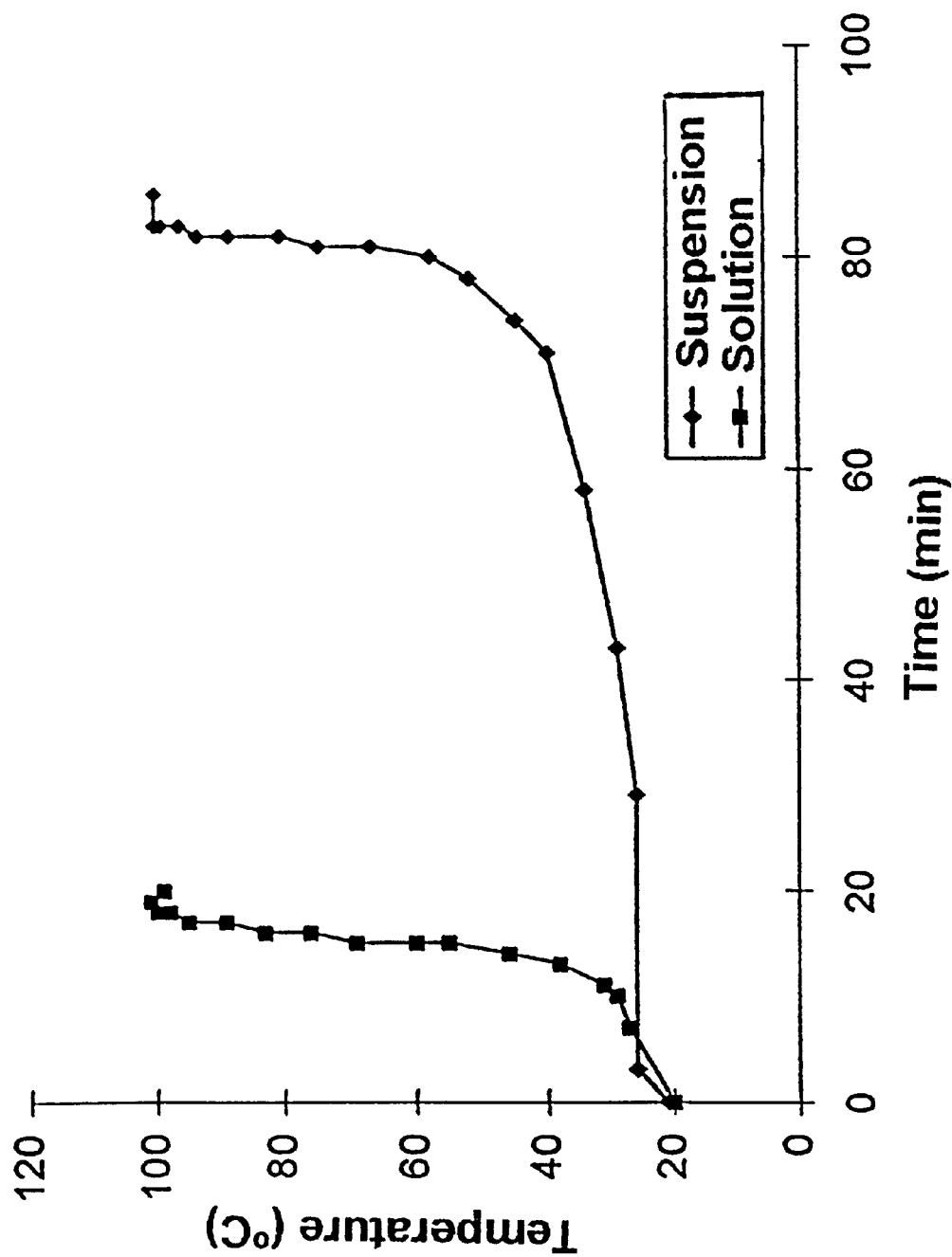
FIG. 1 is a graph which illustrates the delaying period of SGN reactions which use the homopolyanhydride of U.S. Ser. No. 08/742,126 in suspension and in solution at 30% weight/volume in chloroform.
Figure 2:
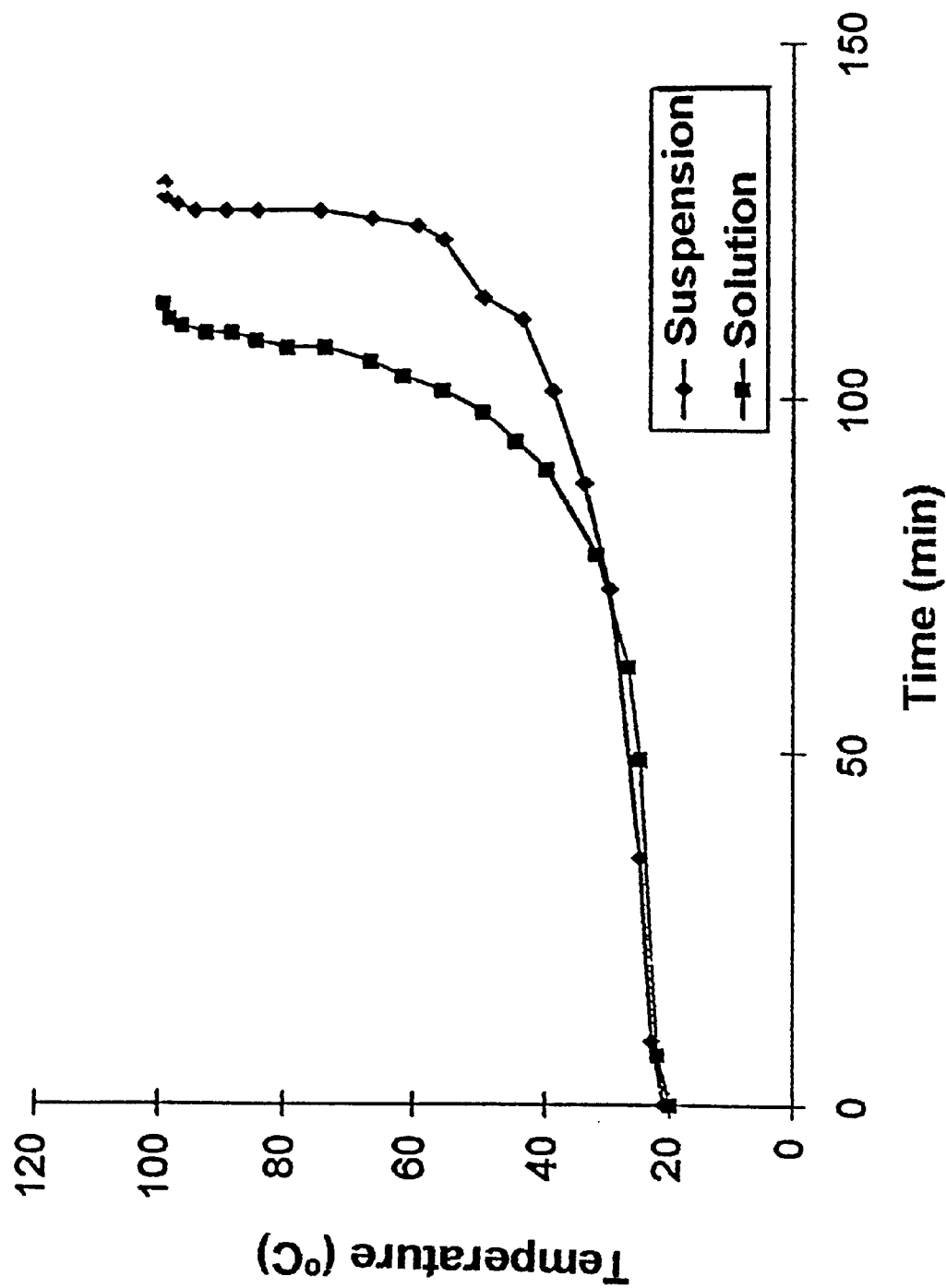
FIG. 2 is a graph which illustrates the delaying period for SGN reactions using a copolyanhydride of the present invention which comprises 50 mole % of sebacic acid, used in suspension and in solution at 30 weight/volume % in chloroform.
Figure 3:
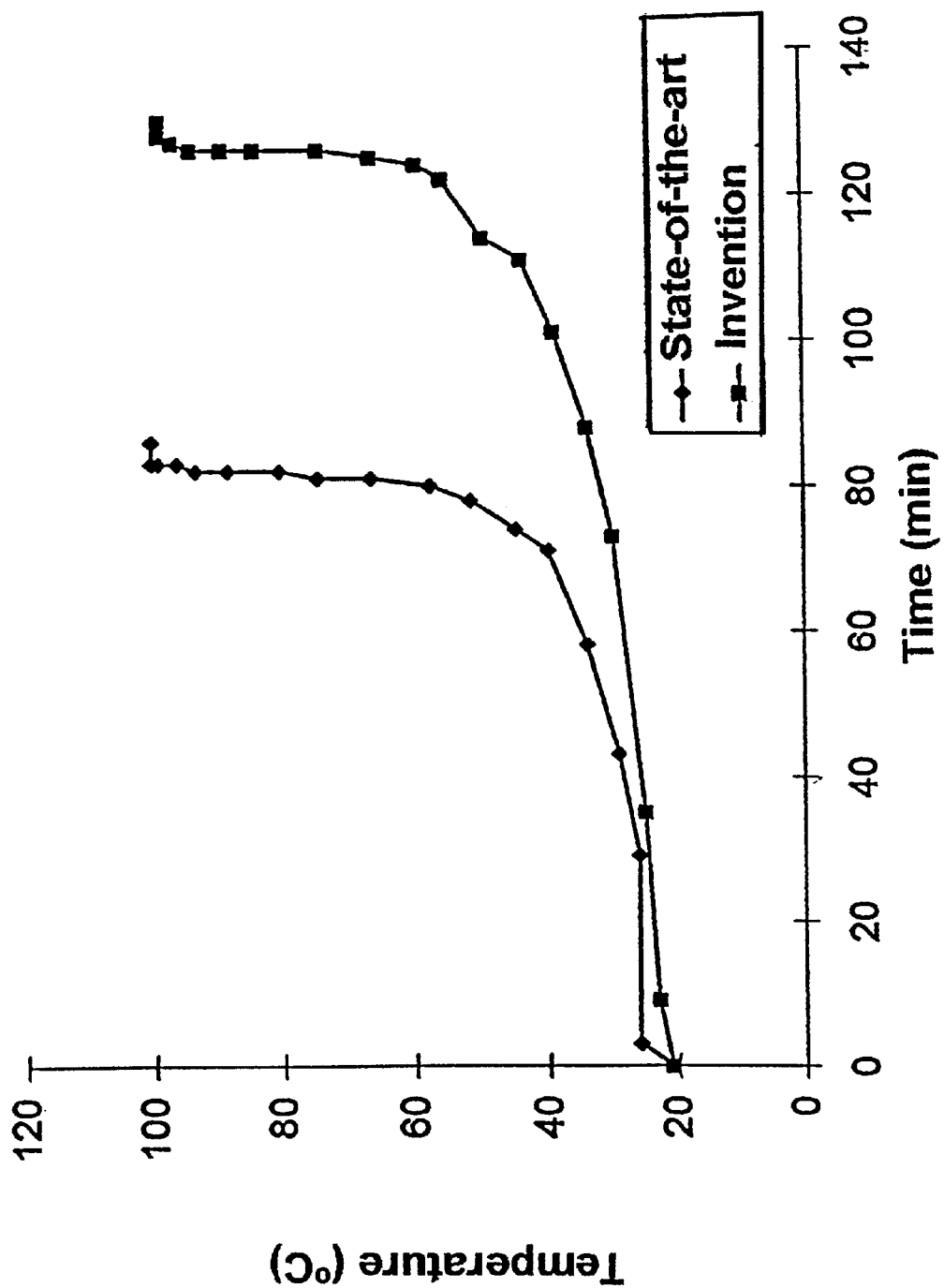
FIG. 3 is a graph which illustrates the delaying period for the polyanhydride of U.S. Ser. No. 08/742,126 and the copolyanhydride of the present invention comprising 50 mole % of sebacic acid, both used in suspension in kerosene.
Figure 4:
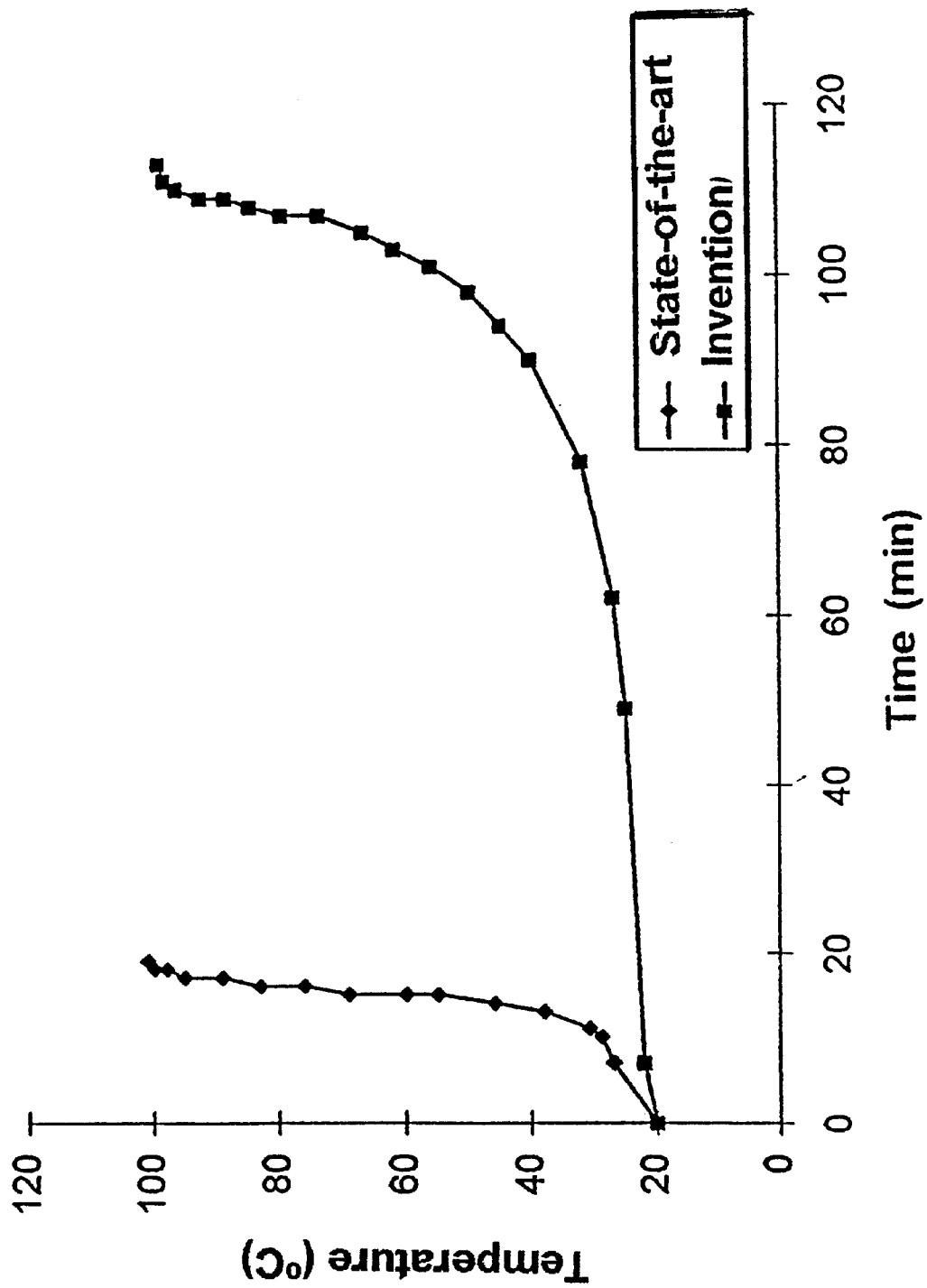
FIG. 4 illustrates the delaying period for SGN reactions using the homopolyanhydride of U.S. Ser. No. 08/742,126 as well as a copolyanhydride of the present invention comprising 50 mole % of sebacic acid in chloroform solution, at 30 weight/volume %.

In the process for preparing the copolyanhydrides useful as delayed action activators in the chemical reaction of the SGN, the Applicant has developed a polymer matrix based on aliphatic anhydrides synthesized from the condensation of two diacids, the condensation product being solubilized in a polar organic solvent, the main feature of such matrix being the accurate control of its hydrodegradability, this control being especially useful for the dewaxing process described herein. Mainly, it has been found that poly(adipic-co-sebacic)anhydride of various molecular weights or its hydrodegradation products solubilized in a polar organic solvent were activators which not only are able to convey long delaying periods to generate nitrogen and heat by chemical reaction but also, the manipulation of the activator as a solution of a copolyanhydride in a polar organic solvent presents several advantages. This delay enables the dewaxing of large dimension lines or conduits, that is, highly extended and/or high volumetric capacity lines while the use of the copolyanhydride solubilized in a polar organic solvent, by increasing the accuracy of the added volumes and hydrolysis rate of the activator eventually increases the performance of the whole dewaxing process.

A process for preparing the copolynhydrides to be used in the dewaxing process comprises the copolycondensation reaction of two carboxylic diacids, preferably adipic acid and an acid in $C_8$–$C_{14}$ such as sebacic; acid, in the presence of excess acetic anhydride, so as to obtain the copolyanhydride. The acetic acid, by-product of the reaction, and the excess acetic anhydride are withdrawn from the reaction medium by distillation under reduced pressure.

In spite of the fact that U.S. Ser. No. 08/742,126 mentioned that adipic acid could be used in combination with other diacids such as glutaric acid, pimelic acid, suberic acid and sebacic acid, it was supposed that these products should be used in suspension. However, as the main goal of the Applicant was to develop a delayed-action activator solubilized in a polar organic solvent, when the use of some ot these copolyanhydrides in solution was tested experimentally it was found that the hydrolysis rate was rendered extremely short, this making such products inadequate as delayed-action activators. Further, when using copolyanhydrides in solution in a polar organic solvent, a determining factor is that in the hydrogen ion release step which triggers the nitrogen- and heat-generation reaction of the SGN system the pH to be attained by the anhydride hydrolysis is equal to or less than 5.0 (for temperatures between 10 and 25° C.) otherwise the SGN reaction does not occur. So a copolyanhydride system should be developed that satisfied, when solubilized in a polar organic solvent, the required level of pH at hydrolysis as well as the required extendede delay of activation. The Applicant has thus prepared copolyanhydrides containing of from 95 to 15 mole % of adipic acid and of from 5 to 85 mole % of sebacic acid to be solubilized in a polar organic solvent such as chloroform, the copolyanhydride-polar organic solvent solution showing the desired features regarding level of pH at hydrolysis, homogeneity at pumping as well as the required delaying of SGN reaction periods.

It was found that delaying periods were a function of the chain length of the comonomer, molar content of comonomer and molecular weight of the copolyanhydride composition to be obtained.

The copolyanhydride object of the present application may be prepared as a composition of linear polyanhydrides, as a batch, from the reaction of carboxylic diacids in the presence of an excess of acetic anhydride, whereby a pre-polymer is formed, under atmospheric pressure and reflux temperature. The pre-polymer is then cooled and reduced pressure is used to remove the acetic acid which is formed and the excess acetic anhydride. The temperature is then increased up to 100–200° C. to effect polymerization. Important parameters are the mole ratio of the feed, the reduced pressure, the temperature and the reaction time. By controlling these parameters, compositions of linear aliphatic anhydrides of controlled molecular weights particularly useful as delayed action activators in the SGN reaction can be prepared. The thus obtained copolyanhydride compositions show distinct molecular weight ranges, which advantageously affects the hydrolytic degradation rates and the SGN reaction delay. The polyanhydride product is kept in an organic solvent in order to avoid hydrolysis. Alternatively low temperatures equally avoid hydrolysis.

Controlled release of $H^+$ ion from the monomeric product is believed to result from the copolyanhydride hydrolysis. The copolyanhydride can be hydrolyzed at controlled rate with release of a $H^+$ ion which functions either as a catalyst or a pH modifier.

The chemical equation below summarizes the copolymerization process which leads to the copolyanhydrides of the present invention:

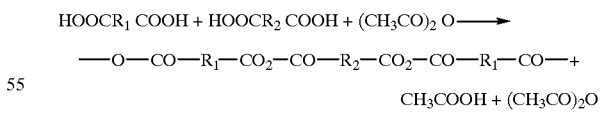

$HOOCR_1 COOH + HOOCR_2 COOH + (CH_3CO)_2 O \longrightarrow$ $—O—CO—R_1—CO_2—CO—R_2—CO_2—CO—R_1—CO—+$ $CH_3COOH + (CH_3CO)_2O$ wherein $R_1$ is $—(CH_2)_4$ (adipic acid) and $R_2$ is $—(CH_2)_8$ (sebacic acid)

Although not bound to any particular theory, the Applicant theorizes that the mechanism of delayed activation of the SGN reaction consists initially of a step of migration of anhydride polymer from the organic phase to the aqueous phase of the emulsion. The slow step of the polymer hydrolysis occurs in the aqueous phase, with generation of the dicarboxylic acid corresponding to the monomer unit.

Then the diacid is dissociated and $H^+$ ion is formed, thus, enabling the onset of the reaction to cause nitrogen generation with heat release. The following sequence of chemical reactions illustrates steps of the theoretical mechanism of delayed activation of the SGN in the presence of a linear, aliphatic copolyanhydride such as poly(adipic-co-sebacic) anhydride.

FIGS. 1 to 4 show that, either used in -suspension or solubilized in a polar organic solvent, the copolyanhydride of the present invention invariably yield longer delaying periods than those which may be obtained from the homopolyanhydrides of U.S. Ser. No. 08/742,126. Thus, the present copolyanhydrides are a natural choice as the delayed-action activator in dewaxing operations of large dimension lines.

---

1st. STEP: POLYMER MIGRATION $H[OOCR_1CO]_n-[OOCR_2CO]_mOH \rightarrow H[OOCR_1CO]_n-[OOCR_2CO]_mOH$
(OIL OR ORGANIC PHASE)     (AQUEOUS PHASE)
wherein n may be the same or different from m and $R_1$ and $R_2$ are as above.

2nd. STEP: POLYMER HYDROLYSIS $H[OOCR_1CO]_n-[OOCR_2CO]_mOH + H_2O \rightarrow HOOCR_1COOH + HOOCR_2COOH$ 3d. STEP: DISSOCIATION OF THE DIACIDS TO GENERATE $H^+$ IONS $HOOCR_1COOH \rightarrow 2 H^+ + OOCR_1COO$
$HOOCR_2COOH \rightarrow 2 H^+ + OOCR_2COO$ 4th STEP: ACTIVATION OF THE REACTION OF THE NITROGEN GENERATION SYSTEM $$NH_4Cl + NaNO_2 \xrightarrow{H^+} N_2 + NaCl + 2 H_2O$$

---

In order that the 4th step of the reaction may occur according to the delaying periods required for the conditions of the present invention, it is important that the hydrolysis of the copolyanhydrides yield a pH of the nitrogen salts solutions in the range of 5.0 or less for temperatures between 10 and 25° C.

Analogously to U.S. Ser. No. 08/742,126, in the present application the delaying time is controlled by the stability to hydrodegradation, since it is the hydrodegradation of the copolyanhydride which will generate the hydrogen ion which triggers the reaction of heat- and nitrogen-generation. Thus, longer delaying periods will be obtained by more stable copolyanhydrides.

Thus, it can be said that in U.S. Ser. No. 08,742,126 the slow or determining step of the sequence above is the 1st. step since the anhydride product is in the solid state and is suspended in an aliphatic hydrocarbon solvent. Significantly and patentably distinct, in the present application, it is the 2nd step which is the slow, determining step while the 1st step is facilitated by the fact that the copolyanhydride product is in the liquid state.

Therefore, contrary to U.S. Ser. No. 08/742,126, in the present application, in view of the fact that the solubilization in a polar organic solvent already places the copolyanhydride in a molecular level, the step of phase migration (1st step in the step sequence above) is made easier while in U.S. Ser. No. 081742,126 this step is slower. This explains why the delaying periods of the SGN reactions effected with the delayed-action activator solubilized in a polar organic solvent is normally shortened relative to the delaying periods of the activator used as a suspension in kerosene as in U.S. Ser. No. 08/1742,126. This is true for the activator of U.S. Ser. No. 08/742,126 as well as for the activators of the present invention (see FIGS. 1, 2, 3 and 4).

DETAILED DESCRIPTION OF THE DRAWINGS

FIG. 1 shows that for large dimension lines which require delyaing periods of the order of 50 to 80 minutes or more, the mere solubilization of a homopolyanhydride in a polar organic solvent does not satisfy such delaying periods.

Figure 5:
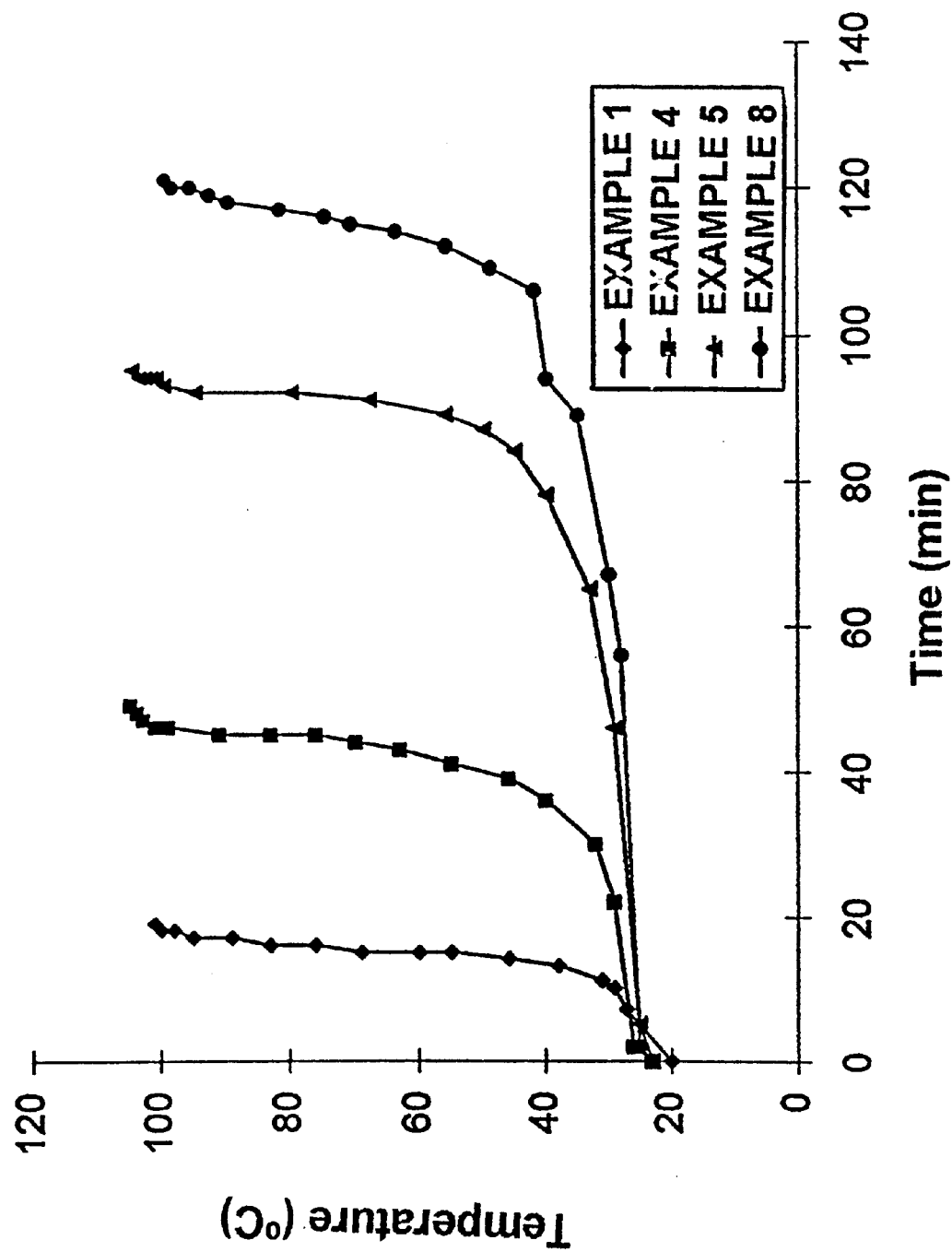
FIG. 5 is a graph which illustrates the delaying period for SGN reactions when the delayed action activator is used in chloroform solution at 30 weight/volume % and with different molar contents in sebacic acid.
Figure 6:
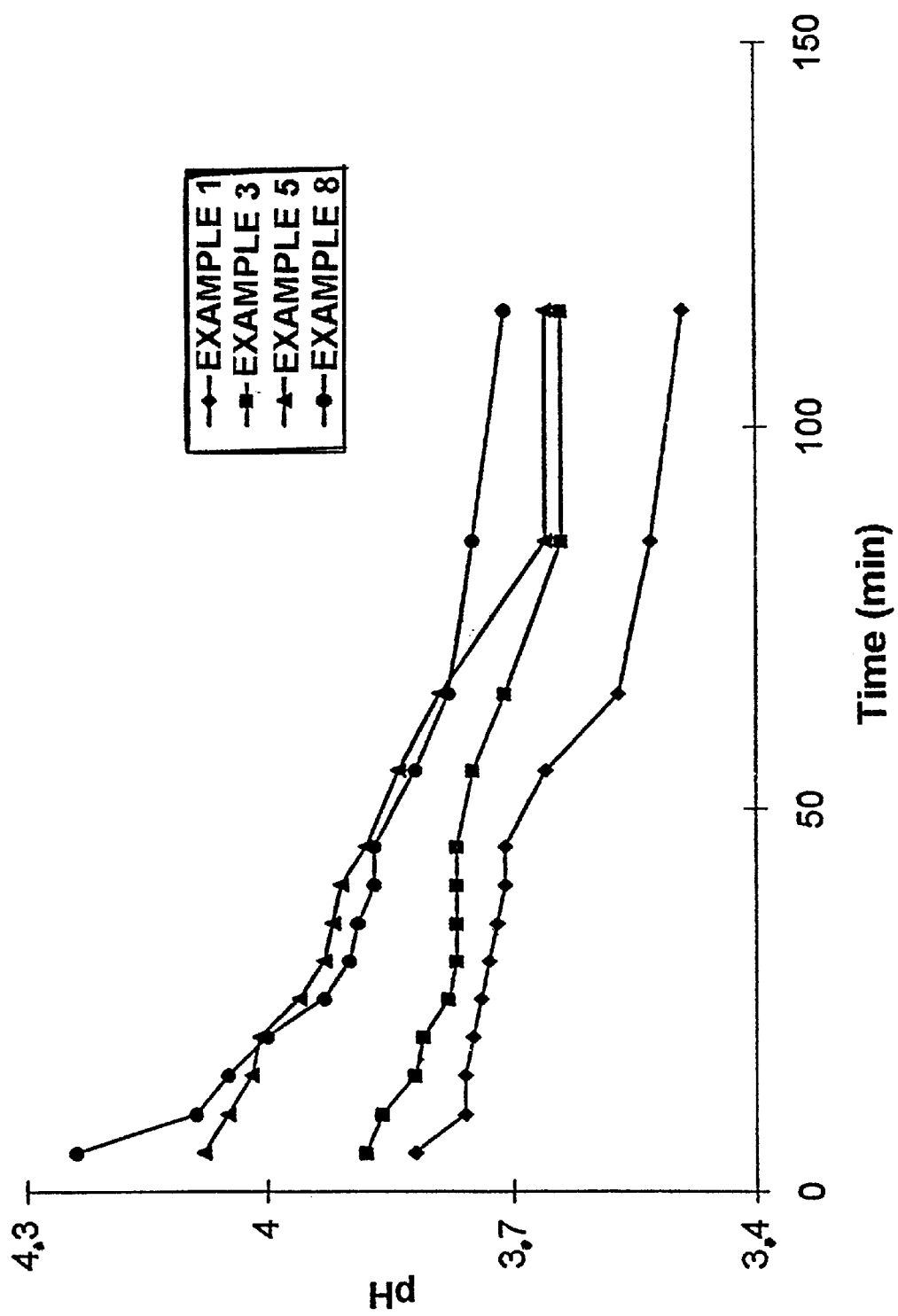
FIG. 6 is a graph which illustrates the hydrodegradability of copolymers containing different contents of sebacic acid according to the present invention.

FIGS. 5 and 6 show that hydrodegradability is a function of the kind and content of the comonomer used, besides the MW of the copolyanhydride. FIG. 5 illustrates the delaying period obtained as a function of molar content of sebacic acid in the copolyanhydride. FIG. 6 shows the hydrodegradability as a function of the comonomer content. For higher contents in sebacic acid, the decrease in pH is less accentuated, thus allowing longer reaction delay. The same trend is to be observed in the curves of FIG. 5.

PREFERRED MODES

The Applicant has developed a delayed action activator to be used in the reaction to generate nitrogen and heat. The activator is included in the emulsion which contains nitrogen salts, such as ammonium halides and alkali metal nitrites, especially ammonium chloride and sodium nitrite. The activator may be based on a poly(adipic-co-sebacic) anhydride polymer matrix, which presents a slow hydrolysis rate pattern. This hydrolysis rate can be controlled from the process conditions used to prepare the polymer. Accordingly, the desired delay of the reaction to generate nitrogen and heat, believed to result from copolyanydride hydrolysis and release of $H^+$ ion, can be precisely planned, to accommodate the length and internal diameter of the line to be dewaxed.

In the present specification and claims, please note the following meanings:

TREATING FLUID is the aqueous solution of reducing nitrogen salt and oxidizing nitrogen salt in equimolar stoichiometry emulsified in an organic solvent.

THE EMULSION is a water/oil emulsion where the internal, aqueous phase is made up by the reducing nitrogen salt and oxidizing nitrogen salt and the external phase is the oil phase made up by the organic solvent.

DELAYED ACTION ACTIVATOR is the copolyanhydride which is used to provide the desired delay in the onset of the heat- and nitrogen-generating reaction.

The improved process for the thermo-chemical dewaxing of long, high internal diameter lines may comprise:

withdrawing any hydrocarbon oil contained in the large dimension line to be dewaxed, one end of the line being connected to a production platform;

preparing and pumping from the platform into the large dimension line a treating fluid including an aqueous solution containing oxidizing nitrogen salt and reducing nitrogen salt in equimolar stoichiometry emulsified in an organic solvent, the so-formed emulsion generating nitrogen and heat inside of the line, with the control of the onset of the reaction of nitrogen and heat generation being maintained by a delayed action activator, which is an aliphatic copolyanhydride, such as poly(adipic-co-sebacic) anhydride solubilized in a polar organic solvent;

maintaining the treating fluid inside of the large dimension line for a period of time which is sufficient to fluidize the paraffin deposit;

after fluidization of the paraffin deposit, recovering the spent fluids and the emulsified paraffin;

resuming well production.

Therefore, the improvement of the present process as compared to the state-of-the-art process described in U.S. Ser. No. 08/742,126 consists in that:

the delayed action activator of the reaction to generate nitrogen and heat, which is to be added to the organic phase of the emulsion, is an aliphatic copolyanhydride solubilized in a polar organic solvent, the hydrodegradability of the copolyanhydride being controlled according to the kind and content of comonomer used as well as by means of the molecular weight of the copolyanhydride. The copolyanhydride comprises adipic acid and a comonomer of a carboxylic diacid in $C_8$–$C_{14}$, the comonomer constituting of from 5 to 85 mole % of the total copolymer, the copolyanhydride being of from 8 to 40 parts in weight per 100 parts in volume of polar organic solvent.

The advantage of the use of the copolyanhydride is that, it being solubilized in a polar organic solvent the manipulation of the delayed action activator is rendered easier, the required amounts are pumped more accurately than the activator suspended in an aliphatic solvent and the hydrolysis rate is also more dependable.

As in U.S. Ser. No. 08/742,126, the solution of nitrogen salts and the resulting emulsion can be prepared at the production platform itself, in a single tank, the solution being stabilized through the addition of NaOH to a pH of 7.0–7.5, the poly (adipic co-sebacic) anhydride activator solubilized in a polar organic solvent being added on flow (i.e. to the emulsion of nitrogen salts solution when the emulsion of nitrogen salts solution is flowing into said conduit) to the aqueous emulsion of nitrogen salts.

Also, the pumping of the treating fluid does not require support vessels, the elimination of which resulting in cost reductions of up to 70%.

The treating fluid employed in the present thermochemical process is basically made up of a solution of nitrogen salts, for example, ammonium chloride and sodium nitrite. This salt solution is emulsified in an organic solvent, preferably a non-hazardous organic solvent, such as maritime diesel and the like. As taught in U.S. Pat. No. 5,183,581 and U.S. Pat. No. 5,639,313, the solutions of nitrogen salts emulsified in an organic solvent are prepared in concentrations which optimize the production of nitrogen and heat according to the needed extent of dewaxing. The solution may have a concentration of between 3.0 and 4.5 molar for each of the nitrogen salts. Only one mixing tank is required for preparing the nitrogen salts solution. In order to stabilize the solution, pH is kept between 7.0 and 7.5 with the aid of NaOH. The solution is emulsified in an organic solvent such as aviation kerosene, maritime diesel, xylene or other organic solvents, chosen according to the kind and nature of the paraffin deposit to be fluidized.

The amount of treating fluid to be used in the present process is in general determined on the basis of a mathematical simulation which calculates the content of deposited paraffin.

The internal volume of the line may be assessed with the aid of a bed of contrasting fluid, as described in U.S. Pat. No. 5,639,313.

The delayed action activator aliphatic copolyanhydride may be poly(adipic co-sebacic) anhydride. The aliphatic copolyanhydrides useful in the present invention comprise those obtained from the copolymerization of adipic acid, that is, an aliphatic carboxylic diacid in $C_6$ and a comonomer which is an aliphatic dicarboxylic acid in $C_8$–$C_{14}$ such as sebacic acid. According to the present invention, the delaying periods to be obtained through the reaction of heat- and nitrogen generation reaction may be controlled by the size of the comonomer chain, the molar content of comonomer present in the copolyanhydride and the molecular weight of the copolymer. Delaying periods are in the range between 20 and 120 minutes, preferably 60 and 100 minutes, according to the length of the conduit or line to be dewaxed, as taught in U.S. Pat. No. 08/742,126. As is well-known by the experts, the delaying period is a function of the hydrolytic stability of the copolyanhydride, so optimum delaying periods will be obtained by the right combination of chain size and content of comonomer present in the copolyanhydride.

The kind and maximum content of comonomer used in the copolyanhydride will be chosen so that when the copolyanhydride is hydrolyzed by contact with the aqueous solution of nitrogen salts, the pH value to be attained is limited to 5.0 or less.

In case the delaying period before the onset of the SGN reaction attains 3, 4 or more hours an adequate comonomer for the activator is an aliphatic carboxylic diacid in $C_{12}$ or higher. However, as the molar content of the long-chain comonomer has an influence on the hydrodegradability, the same delaying periods may be obtained by using increased molar contents of a shorter chain comonomer. Therefore lower contents of longer chain comonomers or higher contents of shorter chain comonomers may yield the same delaying periods, the choice of either comonomer being dictated by cost and availability factors. Also, as discussed before, the molecular weight of the copolyanhydride is an important feature in the hydrodegradability rate, copolyanhydrides of higher molecular weight being more stable to hydrolysis.

Therefore, the delayed action activator which is a copolyanhydride solubilized in a polar organic solvent according to the present invention makes possible that by correctly manipulating the several parameters involved in the dimensioning of the copolymerization reaction the desired delaying periods for each SGN reaction be obtained in a very smooth, accurate and facilitated way not known nor suggested by the state-of-the-art technique. The copolymers useful as delayed-action activators of the present invention comprise thus those obtained from the copolymerization of aliphatic carboxylic diacids where one monomer is adipic acid and the comonomer is an aliphatic carboxylic diacid in $C_8$–$C_{14}$ such as sebacic acid, dodecanoic acid or tetradecanoic acid. Additional, longer-chain diacids up to $C_{18}$ may be used whenever the delaying periods to be obtained are longer than those required by the present industrial process.

The polar organic solvents useful in the present invention are those able to quick and completely solubilize the copolyanhydride at temperatures between 20 and 30° C. The polar organic solvent should be completely moisture-free and analytical grade. The preferred polar organic solvents are chloroform and carbon tetrachloride.

The delayed-action activators of the present invention are obtained by dissolving the copolyanhydrides in a polar organic solvent, yielding solutions which contain of from 8 to 40, preferably of from 10 to 30 weight % of copolyanhydride percent volume of said solvent.

The amount of activator to be added to the solution of heat- and nitrogen-generating salts emulsified in an aliphatic solvent—SGN/Emulsion—varies between 0.1 and 1.0% by weight of active matter (active matter meaning the weight of copolyanhydride free of solvent), as a function of the kind, content and molecular weight of the comonomer in $C_8$–$C_{14}$.

Throughout the present application, the expressions "controlled hydrodegradability" and "stability to hydrolysis" should be understood as the possibility of, by means of the control of variables such as kind and content of comonomer and molecular weight of the copolyanhydride obtained, to accurately tailor the delaying periods of the copolyanhydride compositions solubilized in a polar organic solvent used in the SGN reactions designed for the dewaxing of hydrocarbon transmission conduits, for example, large-dimension conduits.

The copolymerization process used to prepare the copolyanhydrides to be solubilized in a polar organic solvent and so yield the delayed-action activators useful in the present invention does not basically differ from the homopolymerization process of the homopolyanhydrides taught in U.S. Ser. No. 08/742,126.

Broadly considered, the procedure for preparing the copolyanhydrides of the present application comprises the condensation of aliphatic carboxylic diacids in the presence of excess acetic anhydride so as to form a pre-polymer, under atmospheric pressure and reflux temperature, followed by cooling and pressure reduction for withdrawal of the acetic acid formed and the excess of acetic anhydride, and then increasing the temperature up to 100–200° C. to effect the copolymerization step.

The copolyanhydride product obtained is kept under low temperature or suspended in an aliphatic organic solvent such as kerosene in order to minimize the depolymerization and hydrolysis reactions which occur at ambient temperature in the presence of moisture.

The determining parameters for the polymerization process are the molar ratio of the feed (MR), vacuum or pressure (P), temperature (T) and time (t). The control of these parameters makes possible that compositions of linear aliphatic copolyanhydrides be prepared, these compositions having the most suitable molecular weight for each desired application of SGN.

It should be understood that, as stated in the present application, the expression "compositions of linear aliphatic copolyanhydrides" means that, contrary to the biomedical applications of similar products, in the present process mixtures or compositions of copolyanhydrides of distinct ranges of molecular weights are obtained, this representing one of the controlling parameters of the hydrolytic degradation, other parameters being the size of the carbon chain of the comonomer as well as the molar content of comonomer.

In view of the controlled hydrodegradability of the delayed-action activators of the present invention based on copolynhydrides solubilized in a polar organic solvent, these activators are useful in all instances where the monomeric products resulting from the hydrolysis of the copolyanhydrides release $H^+$ ions in a controlled way. Such situations comprise those where a compound is required which is soluble in an organic solvent and insoluble in water, but still, hydrolyzable at controlled rates with release of a hydrogen ion having a catalytic role or being simply a modifier of the pH of the medium.

Broadly speaking, the copolymerization process of the present applicatin comprises contacting adipic acid and an aliphatic carboxylic diacid comonomer in $C_8$–$C_{14}$ in a molar amount of from 5 to 85%, more preferably of from 25 to 75 mole % of the comonomer, in the presence of excess acetic anhydride, at a sufficiently high temperature, obtaining a pre-polymer, then distilling, under reduced pressure, the acetic acid by-product of the reaction and the excess acetic anhydride added, and finally letting grow the polymer chain under reduced pressure and sufficiently high temperature.

Thus, adipic acid and the comonomer are dissolved in acetic anhydride under heating. The molar ratio of acetic anhydride to the comonomer feed varies between 3 and 5. The mixture is then heated to the boiling temperature, that is, between 100 and 150° C., preferably between 120 and 140° C.

In order to obtain the pre-polymer, the reaction conditions regarding temperature are kept for up to 60 minutes, preferably from 20 to 40 minutes.

Then, without any separation or treatment of the obtained pre-polymer, the reaction mixture is cooled and the reactor top is directed to a condenser having condensate collect vessels and a vacuum pump placed upstream. Reduced pressure is used between 160 and 10 mm Hg. The reactor is then heated so as to vaporize the acetic acid and acetic anhydride present in the reaction mixture. By eliminating the acetic acid and anhydride the reactor temperature is increased. By keeping the same level of reduced pressure the reaction mixture is rapidly heated up to the polymerization temperature. Temperatures between 130 and 190° C. may be used. The overall reaction time is between 5 and 20 hours.

During the copolymerization reaction the distillation of acetic acid and anhydride is continued.

The present process leads to copolyanhydrides of controlled hydrodegradability, useful in SGN reactions.

The reaction products are characterized regarding melting point with the aid of DSC (Differential Scanning Calorimetry) in a DSC 7 Perkin Elmer Instrument. The nitrogen purge flowrate is 30 ml/min, and the heating rate is 10° C./min. The melting points relate to the onset of the melting temperature.

$H^1$ NMR was used in order to obtain values of molecular weight and composition of the copolyanhydrides. Analyses were effected under quantitative conditions previously established in a VARIAN Gemini-30 instrument.

The present invention may be illustrated by examples in labscale, pilot scale besides a field example, that is, the dewaxing of a large dimension conduit where the delayed-action activator is a copolyanhydride of the present invention solubilized in a polar organic solvent.

EXAMPLES 1 to 8

These Examples refer to labscale copolyanhydride products, prepared according to the procedure described above. Copolymerization reactions were effected in a 1.0 gallon reactor, the molar ratio of acetic anhydride to adipic acid and sebacic acid being 3. The comonomer used was sebacic acid ($C_{10}$) in a molar amount between 25 and 75%. For each molar amount at least two experiments were run.

TABLE 1 below lists data on the parameters of the process for preparing the copolyanhydrides where P is the reduced pressure, T the temperature and t the time. TABLE 1 shows also data for melting point ($T_m$), molecular weight (MW) of the polyanhydride and mole percentage of the sebacic polyanhydride. $C_{10}$ means the sebacic acid comonomer. The molar content of the sebacic acid in the product was determined by $H^1$ NMR.

TABLE 1

| Ex. n° | T (° C.) | t (min) | Composition (mole % $C_{10}$) | | $T_m$ (° C.) | MW |
|---|---|---|---|---|---|---|
| | | | in Feed | in Product | | |
| 1 | 142 | 397 | 0 | 0 | 75.0 | 2,960 |
| 2 | 150 | 450 | 0 | 0 | 80.0 | 9,483 |
| 3 | 150 | 437 | 25 | 28.9 | 55.0 | 75,800 |
| 4 | 170 | 170 | 25 | 26.6 | 56.0 | 40,600 |
| 5 | 150 | 342 | 50 | 56.6 | 60.0 | 20,030 |
| 6 | 170 | 460 | 50 | 47.0 | 59.5 | — |
| 7 | 170 | 460 | 75 | 79.0 | 67.5 | 49,700 |
| 8 | 150 | 507 | 75 | 77.0 | 70.0 | 7,000 |

Reactions were run under reduced pressure of 160 mm.

Data of TABLE 1 show that the variation of operation conditions such as P, T and t yield products which are compositions of varied molecular weights, as mentioned in U.S. Ser. No. 08/742,126. Thus, due to longer reaction time and higher reaction temperature, Example 2 shows a higher MW than Example 1, due to longer reaction time Example 3 shows higher MW than Example 4 and due to higher reaction temperature Example 7 shows a higher MW than Example 8.

As stated in U.S. Ser. No. 08/742,126 and in view of studies which show that the hydrolysis rate of the copolyanhydrides is a function of the molecular weight, an increase in the delaying period to effect the hydrolysis of the polyanhydride by contact with the heat- and nitrogen-generating aqueous solution is to be expected as a result of an increase in the molecular weight of the copolyanhydrides.

It is also found that the hydrolysis rate is a function of the molar composition of the comonomer, as illustrated in FIG. 6 attached.

The delaying period of the SGN reaction is also a function of the pH of the heat- and nitrogen-generation reaction, as well as of the amount of copolyanhydride activator added to such solutions.

The evaluation of the copolyanhydrides of the invention as delayed-action activators for SGN is based on the controlled hydrolysis of the copolyanhydride in contact with the nitrogen salts aqueous solution, the copolyanhydride being hydrolyzed so as to yield the original anhydride monomers. Then, these monomers need also a certain delay to dissociate in the aqueous phase of the SGN system, releasing hydrogen ion and initiating the heat- and nitrogen generation reaction.

The effect of the copolyanhydrides on the delay of the SGN reaction is checked by means of a laboratory procedure as follows:

The SGN/Emulsion is prepared as taught below:

A 4.5 molar solution of $NaNO_2$ and $NH_4Cl$ is prepared, the pH being adjusted in the range of 7.0 and 8.0 with the aid of NaOH.

Then, 40 volume percent of the above solution, 60 volume percent of an aliphatic hydrocarbon solvent such as aviation kerosene or maritime diesel and 0.1 volume percent of lipophilic, non ionic emulsifier such as a sorbitan ester are used to prepare an emulsion in a high-shear mixer the emulsion being then introduced in a three-necked flask followed by the delayed-action activator copolyanhydride as a chloroform solution or suspended in kerosene for comparative purposes. The content of activator based on the SGN/Emulsion is between 0.1 and 1.0 weight % of active matter, according to the content and molecular weight of the $C_8$–$C_{14}$ comonomer in the copolymer.

The SGN reaction occurs as follows:

The reaction is effected according to the adiabatic mode, vacuum being created in a sheath which surrounds the three-necked flask. The contents of the flask are agitated with a magnetic stirrer up to the point where a nitrogen gas bubble appears. Then the agitation is stopped, the generated turbulence being exclusively due to the nitrogen gas produced by the reaction.

Performance data are obtained by readings of the temperature of the reaction mass (which ought to reach figures which are higher than the melting temperature of the paraffin which is to be fluidized) and by means of the volume of generated nitrogen, which is read in an inverted gauged flask which contains water and is connected to the three-necked flask.

By using the procedure above laboratory data as illustrated in FIGS. 1 to 5 were obtained. To obtain experimental data 0.7 ml of solution at 30 wt/volume % of copolyanhydride in chloroform were used. For comparative tests 1.2 ml of a suspension in aviation kerosene with 17 weigh/volume % of copolyanhydride were used.

EXAMPLE 9

This Example illustrates the preparation of the copolyanhydrides in the pilot scale and as a consequence, the viability that these compounds be prepared in an industrial scale. In a 100 liter-capacity pilot plant reactor were charged 18.0 kg adipic acid, 8.0 kg sebacic acid and 50 kg acetic anhydride. Heating is started under agitation, the reaction mixture being kept at boiling temperature for 30 minutes, after which the mixture is cooled to 40° C. and the top of the reactor is linked to a condenser provided with vessels for condensate collection and a vacuum pump. The pressure is of the order of 20 mm Hg. The reactor is then heated to the final temperature of 160° C., initially for eliminating the excess both of acetic anhydride added and acetic acid formed and finally for allowing the growing of the polymer chain. Overall reaction time was 10.0 hours. The composition of poly(adipic-co-sebacic)anhydride had the following features: molecular weight by NMR=14,230 and melting temperature 48.0° C.

EXAMPLE 10

The conditions for the application of the copolyanhydrides solubilized in a polar organic solvent were checked in the waxed line of a well of the Campos Basin, Rio de Janeiro, Brazil. A sample of poly(adipic-co-sebacic) anhydride containing 25 mole % of sebacic acid was characterized as for average molecular weight, active matter concentration and melting point.

TABLE 2 below lists the features of copolyanhydride in solution.

TABLE 2

| PROPERTY | VALUE |
| --- | --- |
| Sebacic acid content in the copolyanhydride (mole %) | 25 |
| Active matter content in chloroform solution (% weight/volume) | 23 |
| Average molecular weight (MW) | 14,000 |
| Melting point (° C.) | 48 |

The main parameters of the SGN/Emulsion used in the treatment were:

Nitrogen salts solution: pH=7.11 concentration: 4.5 molar volume employed: 12 m$^3$ Solvent for the emulsion: aliphatic solvent, kerosene volume employed: 18 m$^3$ Non ionic emulsifier: Sorbitan ester (ATPET 200) volume employed: 10 liters Delayed-action activator poly(adipic-co-sebacic) anhydride, @ 25 mole % sebacic acid solubilized in chloroform volume employed: 210 liters The line to be dewaxed had 7,370 meters length and internal diameter of 4 inches. The waxing was estimated as 30% based on the normal volume of the line, which means nearly 11 m$^3$ of wax in the line. By using the present process it could be seen that a delay of 45 minutes for the SGN reaction could be obtained. After the treatment with SGN, the flowrate of oil production increased from 120 m$^3$/day to 288 m$^3$/day, that is, an increase of 140%.

The pumping of the delayed-action activator solubilized in chloroform according to the present was smooth and regular, the required volumes being introduced in the line in a very accurate and homogeneous way.

Therefore, the action of the delayed-action activators of the present application is directed to a wide range of delaying periods, besides rendering very easy and accurate the manipulation of large volumes of activator, such conditions being not suggested, not known nor obtainable in the state-of-the-art activators.

What is claimed is:

1. Improved method based on SGN/Emulsion for the thermo-chemical dewaxing of a hydrocarbon transmission conduit containing paraffin deposit, said method comprising the steps of:

(a) introducing into said conduit an emulsion comprising an internal aqueous phase and an external organic phase, said aqueous phase comprising an oxidizing nitrogen salt, a reducing nitrogen salt and water, and said organic phase comprising a non-polar organic liquid, said emulsion comprising a delayed action activator for inducing the reaction of said oxidizing nitrogen salt and said reducing nitrogen salt;

(b) maintaining said emulsion in said conduit under conditions sufficient to fluidize the paraffin deposit and to generate nitrogen gas and heat from the reaction of said oxidizing nitrogen salt and said reducing nitrogen salt; and (c) removing the fluidized paraffin deposit from said conduit, wherein the improvement comprises a delayed action activator which is a linear, aliphatic copolyanhydride solubilized in a polar organic solvent.

2. Improved method according to claim 1, wherein the delayed action activator solubilized in a polar organic solvent is added to the emulsion of nitrogen salts solution when the emulsion of nitrogen salts is flowing into said conduit.

3. Improved method according to claim 1, wherein the polar organic solvent is chloroform.

4. Improved method according to claim 1, wherein the linear copolyanhydride is the reaction product of an aliphatic carboxylic diacid in $C_6$–$C_8$ and of from 5 to 85 mole % of a comonomer which is an aliphatic carboxylic diacid in $C_8$–$C_{14}$, the aliphatic copolyanhydride being solubilized in chloroform, the amount by weight of aliphatic copolyanhydride percent volume of chloroform being between 8 and 40%.

5. Improved method according to claim 4, wherein the preferred amount of $C_8$–$C_{14}$ comonomer is between 25 and 75 mole % and the preferred amount by weight of linear aliphatic copolyanydride percent volume of chloroform is between 10 and 30%.

6. Improved method according to claim 1, wherein the linear aliphatic copolyanhydride is obtained by copolymerization of a carboxylic diacid in $C_6$–$C_8$ and a comonomer which is a dicarboxylic acid in $C_8$–$C_{14}$ in the presence of an excess acetic anhydride so as to form a pre-polymer, under atmospheric pressure and reflux temperature, followed by cooling and pressure decrease to withdraw the acetic acid formed and excess acetic anhydride, and increase in temperature up to 100–200° C. to effect copolymerization.

7. Improved method according to claim 5, wherein the preferred carboxylic diacid in $C_8$–$C_{14}$ is suberic acid, decanoic acid, dodecanoic acid and tetradecanoic acid.

8. Improved method according to claims 1 or 7, wherein the preferred carboxylic diacid in $C_6$–$C_8$ is adipic acid and the preferred comonomer in $C_8$–$C_{14}$ is sebacic acid.

9. Improved method according to claim 4, wherein the linear, aliphatic copolyanahydride is added to the heat- and nitrogen generating solution in an amount of from 0.1 to 1.0 weight % of active matter based on the volume of said solution emulsified in an aliphatic solvent, said amount being a function of the type and molar content of the comonomer in $C_8$–$C_{14}$ as well as of the molecular weight of the linear, aliphatic copolyanhydride.

10. Improved method according to claim 1, wherein control of hydrodegradability of the delayed action activators solubilized in chloroform is made possible through the choice of the type and molar content of comonomer and the molecular weight of the linear, aliphatic copolyanhydride.

11. Improved method according to claim 1, wherein hydrolysis of the delayed-action activator when made to contact the aqueous solution of nitrogen salts of the SGN/Emulsion yields a solution having a pH of 5.0 or less, at temperatures between 10 and 25° C. so as to initiate the heat- and nitrogen-generation reaction.

* * * * *